W. S. PRATT.
ANTIFRICTION JOURNAL BOX.
No. 28,195  Patented May 8, 1860.
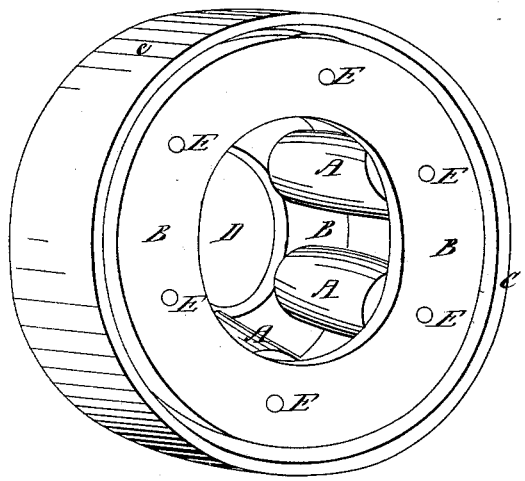
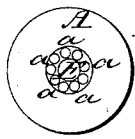
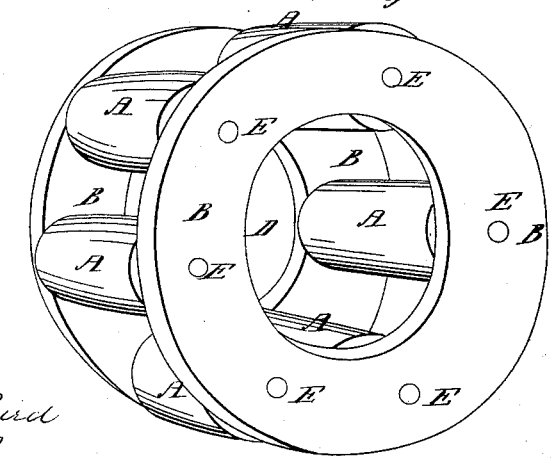
Witnesses
Howard Bird
S. D. Law
Inventor
Wm S Pratt

UNITED STATES PATENT OFFICE.

WILLIAM S. PRATT, OF WILLIAMSBURG, NEW YORK.

ANTIFRICTION JOURNAL-BOX.

Specification of Letters Patent No. 28,195, dated May 8, 1860.

*To all whom it may concern:*

Be it known that I, WILLIAM S. PRATT, of Williamsburg, State of New York, have invented a new and useful Improvement in the Construction of Antifriction Journal-Boxes; and I do hereby declare that the following is a full, clear, and exact description thereof and of its construction and mode or manner of operation, reference being had to the accompanying drawings, and to the letters of reference marked thereon, making a part of this specification.

Figure 1, is a view of a journal box complete, ready for the insertion of an axle or shaft within it. Fig. 2, is a view of the arrangement of the antifriction rollers between the shaft or axle and the journal box proper. Fig. 3, is a vertical section of one of the rollers seen in Fig. 2, showing its interior construction and arrangement.

My invention is an improvement upon such journal boxes as make use of friction rollers interposed between the axle and the outer bed or plate of such journal boxes, and has more particular reference to the internal arrangement or construction of such rollers, so that all sliding friction is avoided by the motion of such rollers about the pin or axis passing through them.

In journal boxes having friction rollers, as heretofore constructed, the rollers A, A, have a fixed axis passing through them, or its equivalent, and hence there is necessarily sliding friction, to a greater or less degree, in the motions of such rollers upon such axes.

The object of my invention is to overcome or rather prevent all such friction, and render the motions of the antifriction rollers and the axes passing through them free from all sliding friction, and thus cause the movement of the axle or journal to be as nearly as possible free from all friction.

The several rollers A, A, are placed between the two rings B, B, and rest and roll upon the inner side of the band or box C, the axle or shaft occupying the central space D, within the rollers A, A. The axles or pins E, which pass through the rollers A, A, keep those rollers in proper position, but do not receive or bear the weight of the axle or shaft within them, as such rollers rest as well as roll upon the band C. As heretofore constructed however, the rollers A, A, have fitted loosely upon and been directly in contact with their axes E, as they have moved upon or within each other, and thus there has been a constant sliding friction between the inner or interior surface of such rollers, and the axes passing through them. When the motions of the parts are rapid the amount of the resistance caused by such friction is considerable, while at the same time it causes a rapid wear of the parts. These objections and defects I obviate and prevent by interposing, within the rollers A, A, and between them, and the fixed pin or axle E, a number of smaller rollers *a, a, a,* as shown in Fig. 3, A representing the larger roller, E, the pin holding such roller in position, and *a, a, a,* representing the smaller rollers interposed between the inner surface of A, and the pin E.

As the pins E, receive the weight of the rings B, B, and the parts supported by them, if the rollers A, and pins E were in direct contact, the sliding friction would be considerable, especially when large shafts or axles were used, and the rings B, B, were heavy; but by the interposition of the rollers *a, a, a,* as described all sliding friction is prevented, and the parts roll easily upon each other, whatever may be their size and weight. It will also be observed from the arrangement of the rollers A, A, resting, and rolling upon the band C, which is fixed, and also lying against the axle or journal, and not resting or bearing upon the pins or axes E, E,—the only use of which, as before stated, so far as these rollers A, A, is concerned, being to keep them in their proper position—that the smaller rollers *a, a, a,* do not in fact rest or press against the pins E, E, but lie and roll upon the interior cavity of the rollers A, thus forming a rolling bed for the pins or axis E, E, and thus carrying the weight of the rings B, B, and the rollers A, A, placed within them, without any sliding friction.

What I claim as my invention and desire to secure by Letters Patent is—

The use and application of the rollers *a, a, a* placed within the rollers A, A, and revolving around the fixed axis E, substantially as and for the purposes set forth.

WM. S. PRATT.

Witnesses:
HOWARD BIRD,
S. D. LAW.